(12) United States Patent
Grosch et al.

(10) Patent No.: US 8,140,057 B2
(45) Date of Patent: Mar. 20, 2012

(54) AUTOMATED CALL CONTEXT NOTIFICATION

(75) Inventors: Helene Grosch, Baillargues (FR); Guillaume Hoareau, Montpellier (FR)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 12/250,878

(22) Filed: Oct. 14, 2008

(65) Prior Publication Data

US 2010/0093315 A1    Apr. 15, 2010

(30) Foreign Application Priority Data

Oct. 10, 2008   (EP) .................................... 08305665

(51) Int. Cl.
*H04M 1/663* (2006.01)
*H04M 3/00* (2006.01)
*H04W 4/00* (2009.01)
*H04B 1/38* (2006.01)

(52) U.S. Cl. ..................... 455/412.2; 455/418; 455/466; 455/560; 455/566

(58) Field of Classification Search ................... 455/403, 455/412.1–412.2, 413, 466, 550.1, 556.2, 455/560–561, 557, 566–567, 414.1–414.4, 455/415–418, 456.3, 458–461, 514; 379/46, 379/67.1, 69, 88.11–88.12, 201.1, 201.07–201.08, 379/211.01

See application file for complete search history.

(56) References Cited

U.S. PATENT DOCUMENTS

| | | | | |
|---|---|---|---|---|
| 6,564,382 | B2 * | 5/2003 | Duquesnois et al. | 725/100 |
| 7,596,131 | B1 * | 9/2009 | Volftsun et al. | 370/352 |
| 7,623,643 | B2 * | 11/2009 | Raghav et al. | 379/201.01 |
| 7,844,038 | B2 * | 11/2010 | Yau et al. | 379/88.26 |
| 2002/0077086 | A1 * | 6/2002 | Tuomela et al. | 455/414 |
| 2003/0169865 | A1 * | 9/2003 | Oren | 379/207.08 |
| 2006/0193448 | A1 | 8/2006 | Donoghue | |
| 2008/0088452 | A1 * | 4/2008 | Agrawal et al. | 340/572.1 |
| 2009/0238346 | A1 * | 9/2009 | Toutain et al. | 379/88.14 |

FOREIGN PATENT DOCUMENTS

WO    WO2005057955 A1    6/2005

* cited by examiner

*Primary Examiner* — Meless Zewdu
(74) *Attorney, Agent, or Firm* — Lee Law, PLLC; Christopher B. Lee

(57) ABSTRACT

A request is received to initiate a context-based voice call, where the request includes a calling number, a called number, and a text string forming a context portion of the context-based voice call. A request is received to initiate a voice call portion of the context-based voice call from the calling number to the called number. The voice call portion and the context portion of the context-based voice call are synchronized between a calling device referenced by the calling number and a called device referenced by the called number. This abstract is not to be considered limiting, since other embodiments may deviate from the features described in this abstract.

16 Claims, 10 Drawing Sheets

AUTOMATED CALL CONTEXT NOTIFICATION

RELATED APPLICATIONS

This application claims priority to and claims the benefit of European Patent Application Serial No. EP08305665.5 titled "AUTOMATED CALL CONTEXT NOTIFICATION," which was filed in the European Patent Office on Oct. 10, 2008, and which is incorporated herein by reference in its entirety.

BACKGROUND OF THE INVENTION

1. Field of the Invention

The present invention relates to systems and methods for notifying a user of a mobile communication device of a purpose for a received telephone call. More particularly, the present invention relates to automated call context notification.

2. Related Art

Telephone systems presently provide certain additional features beyond the connection of a telephone call between two telephones. Caller identification (ID) and call-waiting call ID are available in many areas and allow users of a telephone to visually determine the telephone number and possibly a name of a calling party associated with a received telephone call. Certain systems allow a user of a telephone to associate a distinctive ring tone with one or more telephone numbers so that the associated distinctive ring tone plays when a telephone call is received from the associated telephone number(s).

BRIEF SUMMARY OF THE INVENTION

The subject matter described herein provides automated call context notification to a receiving party of a telephone call. A calling party is provided with an opportunity to enter call context information (e.g., text or a priority indicator) to associate with the call prior to initiating delivery of the call to the receiving party. A call context notifier is created that includes the call context information. The call context notifier is delivered along with a ring tone for the telephone call to the receiving telephone device. As the call is received, the call context information is displayed in association with any incoming call information, such as the calling party telephone number and/or an alias resolution (e.g., name). The call context information is presented with the incoming call information via a display on the receiving telephone device to notify the receiving party of the purpose for the call. The call content information is also stored within a call history list for later viewing. The user of the receiving telephone device may prioritize receipt of the incoming call and may return missed calls based upon the received call context information.

For example, if a school is trying to reach a parent, the school may enter a message such as "your child has been injured" as context information for a call to the parent. In this way, the parent is notified of the context of the call prior to answering the telephone call and may prioritize answering the call or may be alerted via the call history list if the call is missed. Additionally, if the parent is in a situation where the receipt of a telephone call is discouraged, such as in a business meeting, the parent will be notified by the call context notifier to find an area where the call may be return or may begin to travel toward a vehicle while returning the call.

A method includes receiving a request to initiate a context-based voice call, where the request comprises a calling number, a called number, and a text string comprising a context portion of the context-based voice call; receiving a request to initiate a voice call portion of the context-based voice call from the calling number to the called number; and synchronizing the voice call portion and the context portion of the context-based voice call between a calling device referenced by the calling number and a called device referenced by the called number.

A system includes a memory adapted to store context-based voice call information; and a processor programmed to: receive a request to initiate a context-based voice call, where the request comprises a calling number, a called number, and a text string comprising a context portion of the context-based voice call, receive a request to initiate a voice call portion of the context-based voice call from the calling number to the called number, and synchronize the voice call portion and the context portion of the context-based voice call between a calling device referenced by the calling number and a called device referenced by the called number.

An alternative system includes a memory adapted to store context-based voice call information; a call indication device adapted to at least one of vibrate, emit sound, and illuminate; a display device adapted to display information for a user; and a processor programmed to: receive a short message service (SMS) message requesting initiation of a context-based voice call, where the SMS message comprises a calling number, a called number, and a text string comprising a context portion of the context-based voice call; extract the text string from the SMS message; receive a request to initiate a voice call portion of the context-based voice call from the calling number to the called number; display the text string as context for the context-based voice call on the display device; generate a call indication to the user via the call indication device; determine whether the voice call portion of the context-based voice call was answered by the user; and store, in response to determining that the voice call portion of the context-based voice call was not answered by the user, the context portion and the calling number to a missed call list within the memory.

A computer program product includes a computer useable medium including a computer readable program. The computer readable program when executed on a computer causes the computer to receive a request to initiate a context-based voice call, where the request comprises a calling number, a called number, and a text string comprising a context portion of the context-based voice call; receive a request to initiate a voice call portion of the context-based voice call from the calling number to the called number; and synchronize the voice call portion and the context portion of the context-based voice call between a calling device referenced by the calling number and a called device referenced by the called number.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

Figure 1:
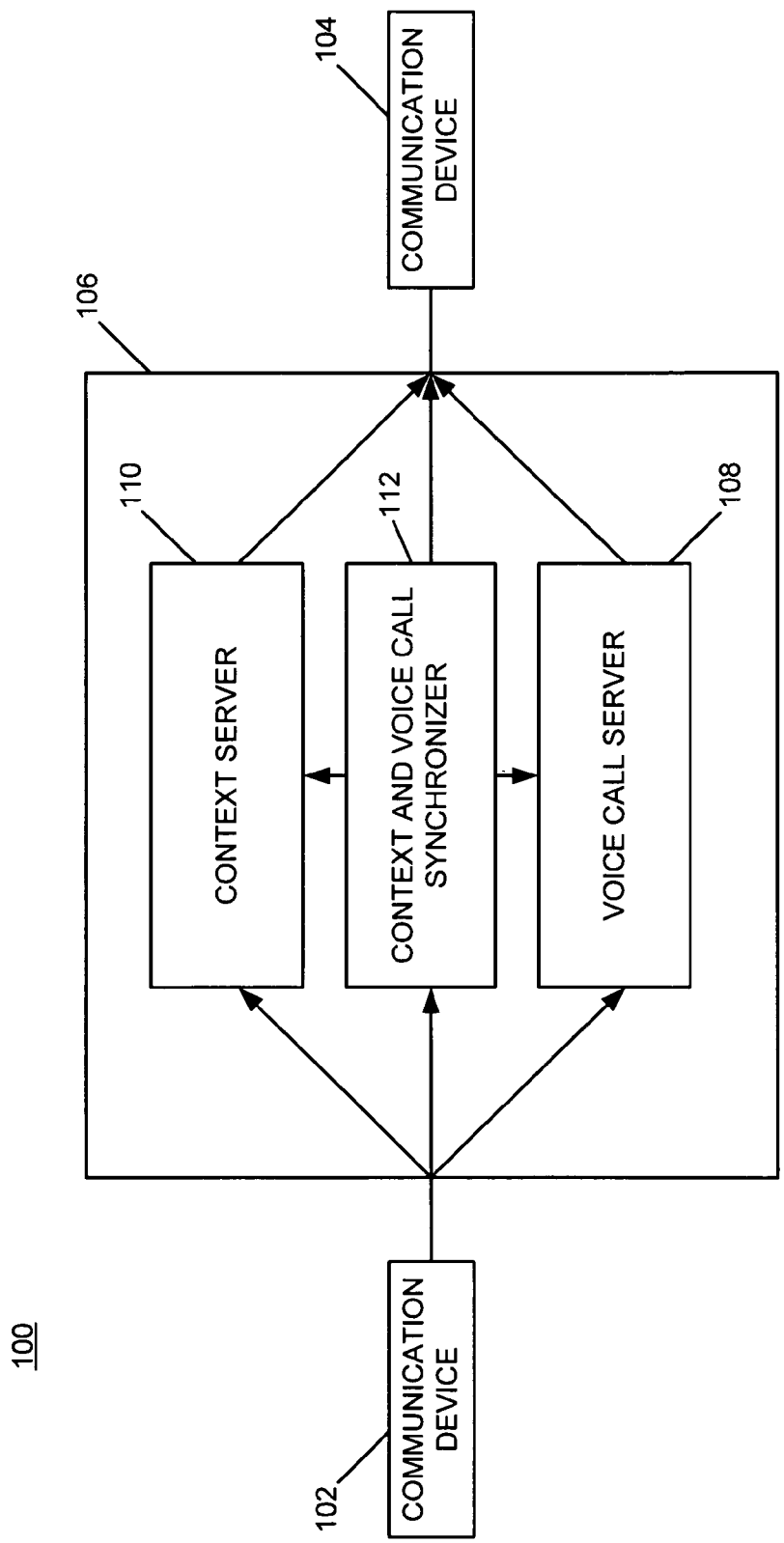
FIG. 1 is a logical block diagram of an example of an implementation of a system for automated call context notification based upon synchronization of a call context notifier and a voice call between communication devices according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated call context notification to a receiving party of a telephone call. A calling party is provided with an opportunity to enter call context information (e.g., text or a priority indicator) to associate with the call prior to initiating delivery of the call to the receiving party. A call context notifier is created that includes the call context information. The call context notifier is delivered along with a ring tone for the telephone call to the receiving telephone device. As the call is received, the call context information is displayed in association with any incoming call information, such as the calling party telephone number and/or an alias resolution (e.g., name). The call context information is presented with the incoming call information via a display on the receiving telephone device to notify the receiving party of the purpose for the call. The call content information is also stored within a call history list for later viewing. The user of the receiving telephone device may prioritize receipt of the incoming call and may return missed calls based upon the received call context information.

The automated call context notification described herein may be performed in real time to allow prompt delivery of call context information to a receiving party. For purposes of the present description real time shall include any time frame of sufficiently short duration as to provide reasonable response time for information processing acceptable to a user of the subject matter described. Additionally, the term "real time" shall include what is commonly termed "near real time"— generally meaning any time frame of sufficiently short duration as to provide reasonable response time for on demand information processing acceptable to a user of the subject matter described (e.g., within a few seconds or less than ten seconds or so in certain systems). These terms, while difficult to precisely define are well understood by those skilled in the art.

For example, if a school is trying to reach a parent, the school may enter a message such as "your child has been injured" as context information for a call to the parent. In this way, the parent is notified of the context of the call prior to answering the telephone and may prioritize answering the call or may be alerted via the call history list if the call is missed. Additionally, if the parent is in a situation where the receipt of a telephone call is discouraged, the parent will be notified by the call context notifier to find an area where the call may be return or may begin to travel toward a vehicle while returning the call.

Figure 3:
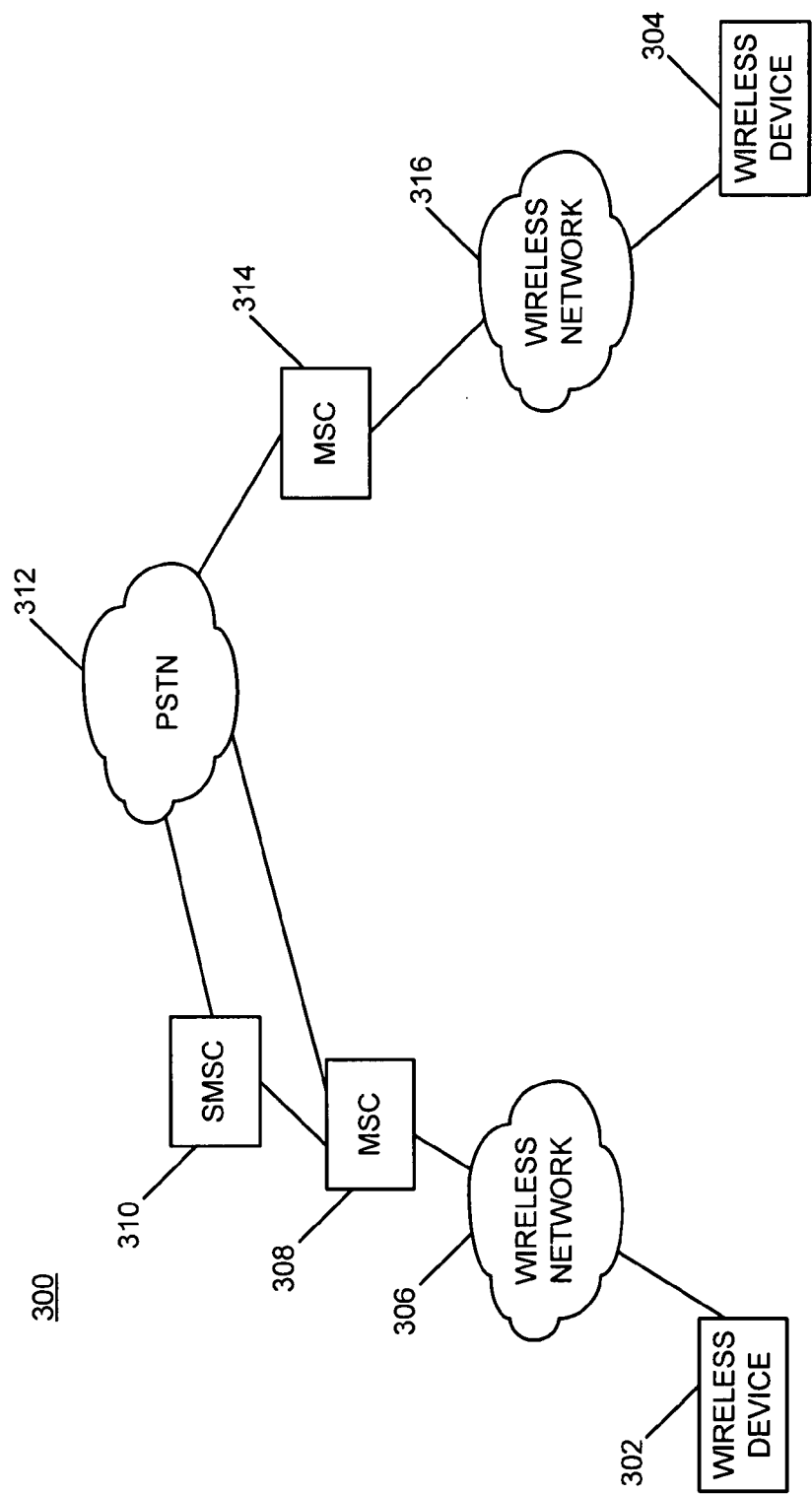
FIG. 3 is a block diagram of an example of an implementation of a system for automated call context notification based upon synchronization of a call context notifier and a voice call between wireless communication devices according to an embodiment of the present subject matter.

FIG. 1 is a logical block diagram of an example of an implementation of a system 100 for automated call context notification based upon synchronization of a call context notifier and a voice call between communication devices. It should be understood that the system 100 is represented as a logical block diagram to illustrate conceptual aspects of the present subject matter. FIG. 3 below illustrates a more-detailed block diagram of an example of an implementation of a system for providing automated call context notification within a telecommunication network.

Within the system 100, a communication device 102 is shown in communication with a communication device 104 via a communication network 106. The communication network includes at least one voice call server 108 and at least one context server 110. The voice call server 108 provides services associated with connection of a voice call between the communication device 102 and the communication device 104. The context server 110 provides context information communication services associated with a voice call within the system 100.

A context and voice call synchronizer 112 coordinates delivery of a voice call and context information associated with the voice call that are managed by the voice call server 108 and the context server 110, respectively. The context and voice call synchronizer 112 coordinates delivery of the voice call and context information associated with the voice call by signaling appropriate for the communication interfaces between components within a given telecommunication system.

The context and voice call synchronizer 112 may be a separate component or may be integrated into one or more of the voice call server 108 and the context server 110 without departure from the scope of the present subject matter. Additionally, certain aspects of the context and voice call synchronizer 112 may also be integrated into one or both of the communication device 102 and the communication device 104. As such, the context and voice call synchronizer 112 may be a distributed entity within the system 100.

As will be described in more detail below in association with FIGS. 2 through 11, a user of a communication device, such as the communication device 102, may choose to initiate a context-based voice call by selecting an option via a user interface. The user may then enter textual context information and/or may select a priority for the context-based voice call. Priorities include priority indicators, such as alpha-based or numerically-based indicators, that provide context information for the pending voice call. For example, a priority indicator may include a textual term, such as "urgent," "ASAP," (e.g., as soon as possible) or other textual term. As well, a priority indicator may include a numerical priority indicator, such as "1," "2," etc. A priority indicator may also combine alpha and numerically-based priority indicators without departure from the scope of the present subject matter.

It should be noted that a communication device, such as the communication device 102 and/or the communication device 104, may be a portable computing device, either by a user's ability to move the communication device to different locations, or by the communication device's association with a portable platform, such as a plane, train, automobile, or other moving vehicle. It should also be noted that a communication device may be any computing device capable of processing information as described above and in more detail below. For example, a communication device may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

Additionally, the communication network 106 may include any type of communication infrastructure, such as a telecommunication network, a wireless network, a computing network, and other communication networks. As such, the communication network 106 includes any form of interconnection suitable for the intended purpose, including a private or public network such as an intranet or the Internet, respectively, direct inter-module interconnection, dial-up, or any other interconnection mechanism capable of interconnecting communication devices and processing of context-based voice calls.

Figure 2:
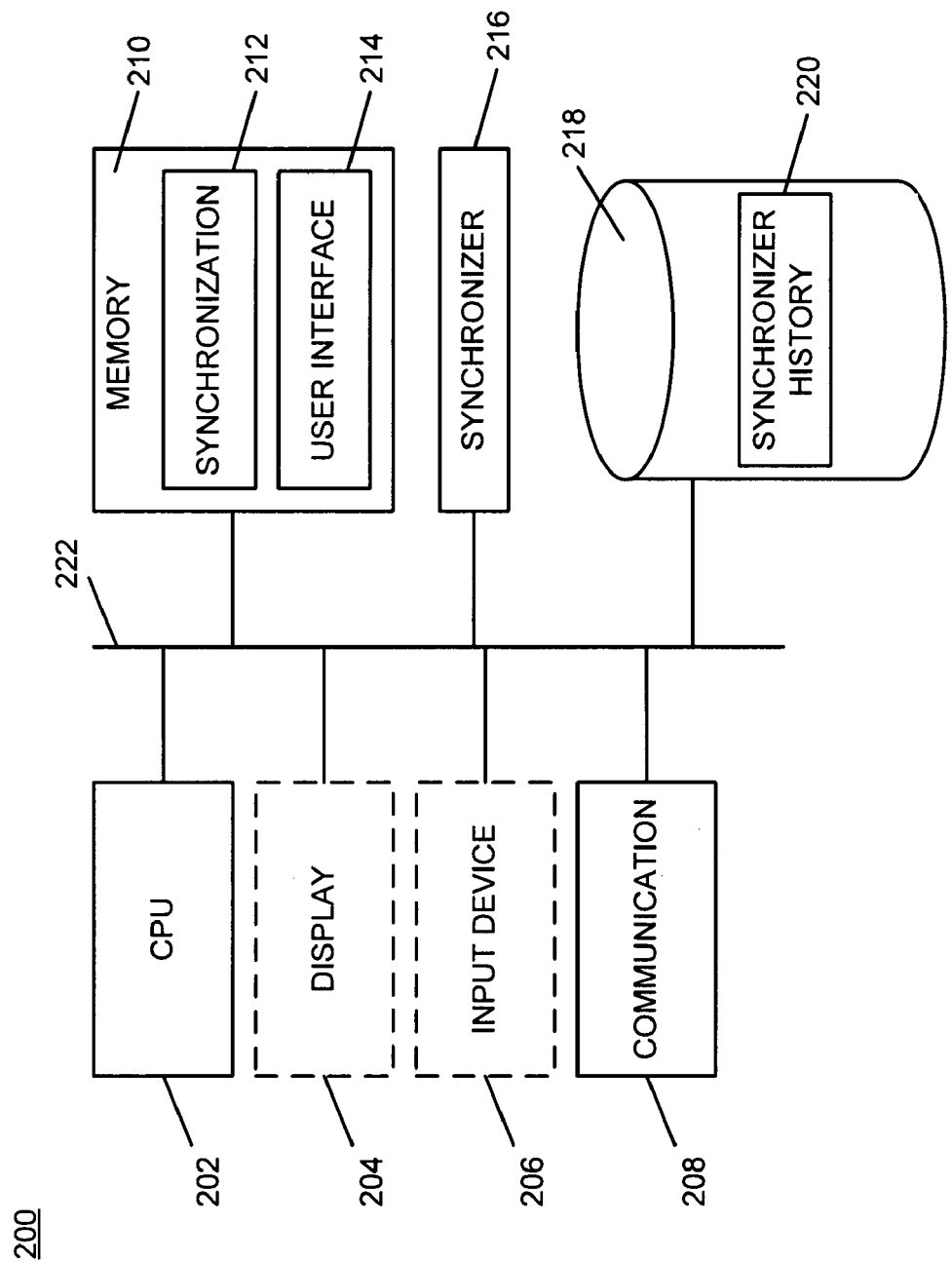
FIG. 2 is a block diagram of an example of an implementation of a context and voice call synchronizing device for performing automated call context notification based upon synchronization of a call context notifier and a voice call between communication devices according to an embodiment of the present subject matter.

FIG. 2 is a block diagram of an example of an implementation of a context and voice call synchronizing device 200 for performing automated call context notification based upon synchronization of a call context notifier and a voice call between communication devices. As described above, the context and voice call synchronizer 112 may be distributed and form a portion of several components within a communication system. Accordingly, the example block diagram of FIG. 2 illustrates one possible implementation of context and voice call synchronization capabilities as a general block diagram. It is understood that the example block diagram of FIG. 2 represents components for context and voice call synchronization associated with any component within a given telecommunication network. For example, the context and voice call synchronizing device 200 may be implemented within the communication device 102 and/or the communication device 104. The context and voice call synchronizing device 200 may also be implemented within the voice call server 108, the context server 110, and the context and voice call synchronizer 112. Each possible block diagram is not represented for brevity and ease of illustration purposes. However, it is understood that the example block diagram of FIG. 2 applies to any other component that implements context and voice call synchronization capabilities.

A central processing unit (CPU) 202 provides computer instruction execution, computation, and other capabilities within the context and voice call synchronizing device 200. A display 204 provides visual information to a user of the context and voice call synchronizing device 200 and an input device 206 provides input capabilities for the user.

The display 204 may include any display device, such as a cathode ray tube (CRT), liquid crystal display (LCD), light emitting diode (LED), projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they are optional components for the communication device 102. When the context and voice call synchronizing device 200 is embodied as one of the communication device 102 and/or the communication device 104, the display 204 and the input device 206 may be used by a user to interact with the respective device. When the context and voice call synchronizing device 200 is embodied as a network component, such as the voice call server 108, the context server 110, or the context and voice call synchronizer 112, the display 204 and the input device 206 may be utilized to provide a network administrator with configuration and control capabilities. Alternatively, the context and voice call synchronizing device 200 may operate as a completely automated embedded device without end user configurability or feedback. However, the context and voice call synchronizing device 200 may also provide user feedback and configurability via the display 204 and the input device 206, respectively.

A communication module 208 provides interconnection capabilities that allow the context and voice call synchronizing device 200 to communicate with other modules within the system 100, such as the voice call server 108 and the context server 110, to synchronize and coordinate delivery of context information in association with a voice call. For system implementations with additional components for context and voice call synchronization, such as the context and voice call synchronizer 112 of FIG. 1, the communication module 208 may also communicate with the context and voice call synchronizer 112 to coordinate delivery of context information in association with a voice call.

The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 includes any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 also includes interrupt-level, stack-level, and application-level modules as appropriate. Furthermore, the communication module 208 includes any memory components used for storage, execution, and data processing for performing processing activities associated with the communication module 208. The communication module 208 may also form a portion of other circuitry described without departure from the scope of the present subject matter.

A memory 210 includes a synchronization storage area 212 that stores synchronization information within the context and voice call synchronizing device 200. As will be described in more detail below, information stored within the synchronization storage area 212 may be used to expedite context association, priority selection, and processing for a voice call. The memory 210 also includes a user interface application 214 that is executed by the CPU 202. The user interface application 214 displays, among other things, context information, options, and feedback to a user via the display 204 and receives input from the input device 206. As will be described in association with FIG. 7 and FIG. 8, context information may be displayed on the display 204 using under control of the CPU 202 executing the user interface 214.

A synchronizer module 216 is also illustrated. The synchronizer module 216 provides context and voice call synchronization capabilities for the context and voice call synchronizing device 200, as described above and in more detail below. The synchronizer module 216 establishes and manages inter-device signaling and associated communication activities for context-based calls. The synchronizer module 216 also manages information storage and retrieval associated with the synchronization storage area 212 and other storage areas as described below.

A database 218 is associated with the context and voice call synchronizing device 200 and provides storage capabilities for information associated with the automated call context notification capabilities of the context and voice call synchronizing device 200. The database 218 includes a synchronizer history storage area 220. Information stored in the synchronizer history storage area may be stored in the form of tables or other arrangements accessible by the context and voice call synchronizing device 200. This information may be created by the synchronizer module 216 in response to receipt of a context-based call. The synchronizer history storage area 220 includes information about active calls, missed calls, connection information, context information, and other associated information to expedite context-based voice call processing. For example, when the context and voice call synchronizing device 200 is associated with a device that is receiving a context-based call, such as the communication device 102 or the communication device 104, the synchronizer history storage area 220 may store call context history information if the user misses (e.g., does not answer) the call. Additionally, call history information for calls that are received by the user may also be stored within the synchronizer history storage area 220.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, a code execution area, and a data area without departure from the scope of the present subject matter.

The CPU 202, the display 204, the input device 206, the communication module 208, the memory 210, the synchronizer module 216, and the database 218 are interconnected via an interconnection 222. The interconnection 222 may include a system bus, a network, or any other interconnection capable of providing the respective components with suitable interconnection for the respective purpose.

While the context and voice call synchronizing device 200 is illustrated with and has certain components described, other modules and components may be associated with the context and voice call synchronizing device 200 without departure from the scope of the present subject matter. Additionally, it should be noted that, while the context and voice call synchronizing device 200 is described as a single device for ease of illustration purposes, the components within the communication device 102 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the communication device 102 are possible and all are considered within the scope of the present subject matter. It should also be understood that, though the synchronizer history storage area 220 is shown within the database 218, it may also be stored within the memory 210 without departure from the scope of the present subject matter.

Figure 4:
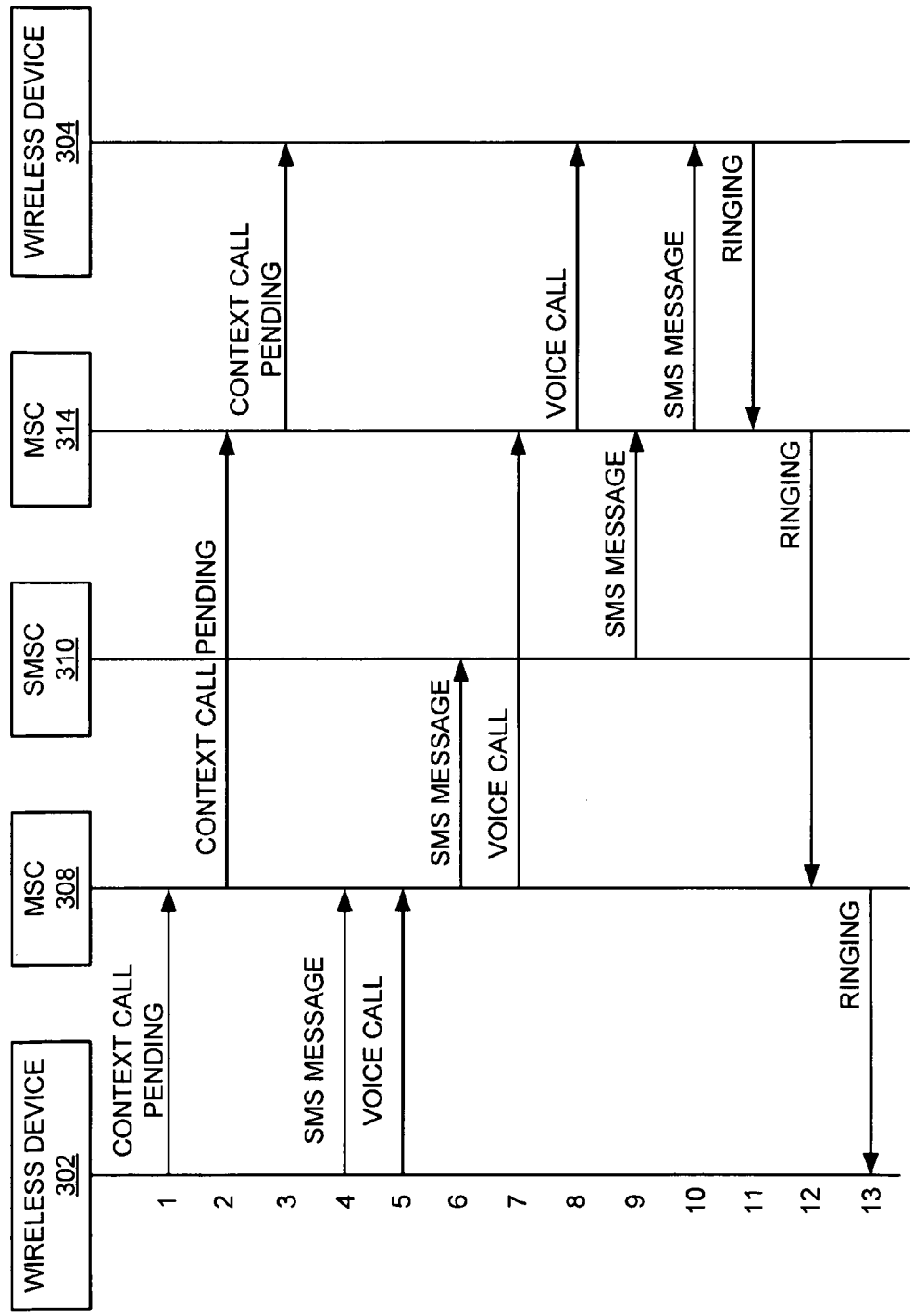
FIG. 4 is a message flow diagram of an example of an implementation of a message sequence for automated call context notification where the receiving device performs synchronization activities according to an embodiment of the present subject matter.
Figure 5:
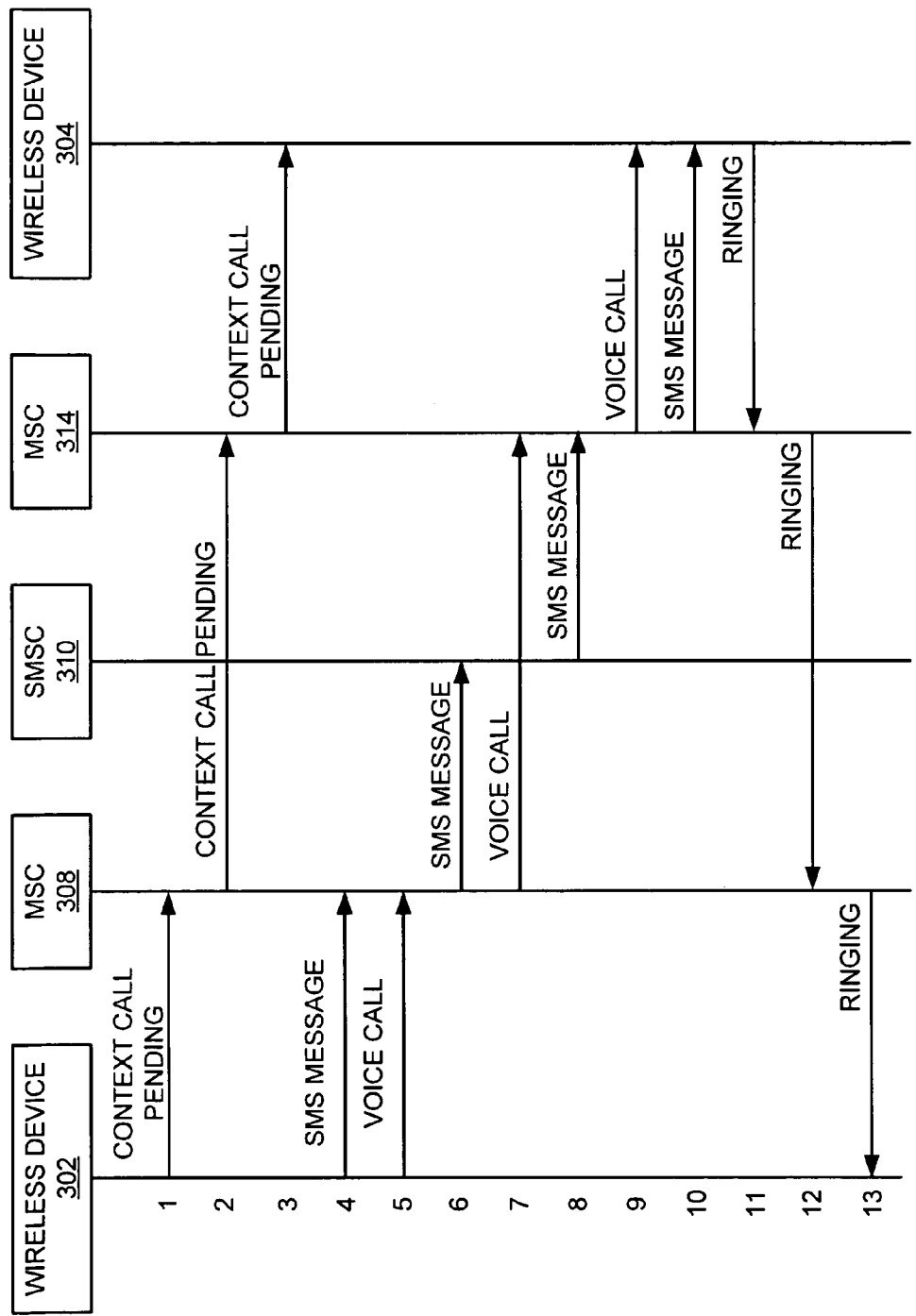
FIG. 5 is a message flow diagram of an example of an implementation of a message sequence for automated call context notification where a mobile switching center associated with a receiving device performs synchronization activities according to an embodiment of the present subject matter.
Figure 9:
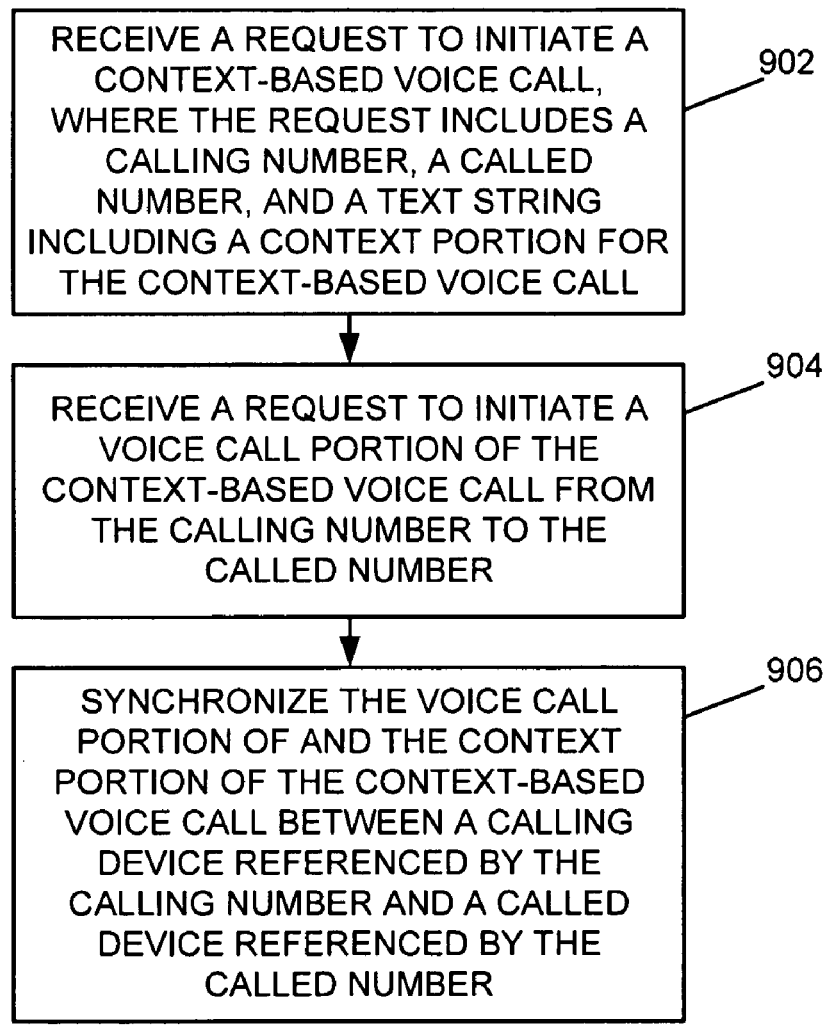
FIG. 9 is a flow chart of an example of an implementation of a process for providing automated call context notification for a context-based voice call according to an embodiment of the present subject matter.
Figure 10:
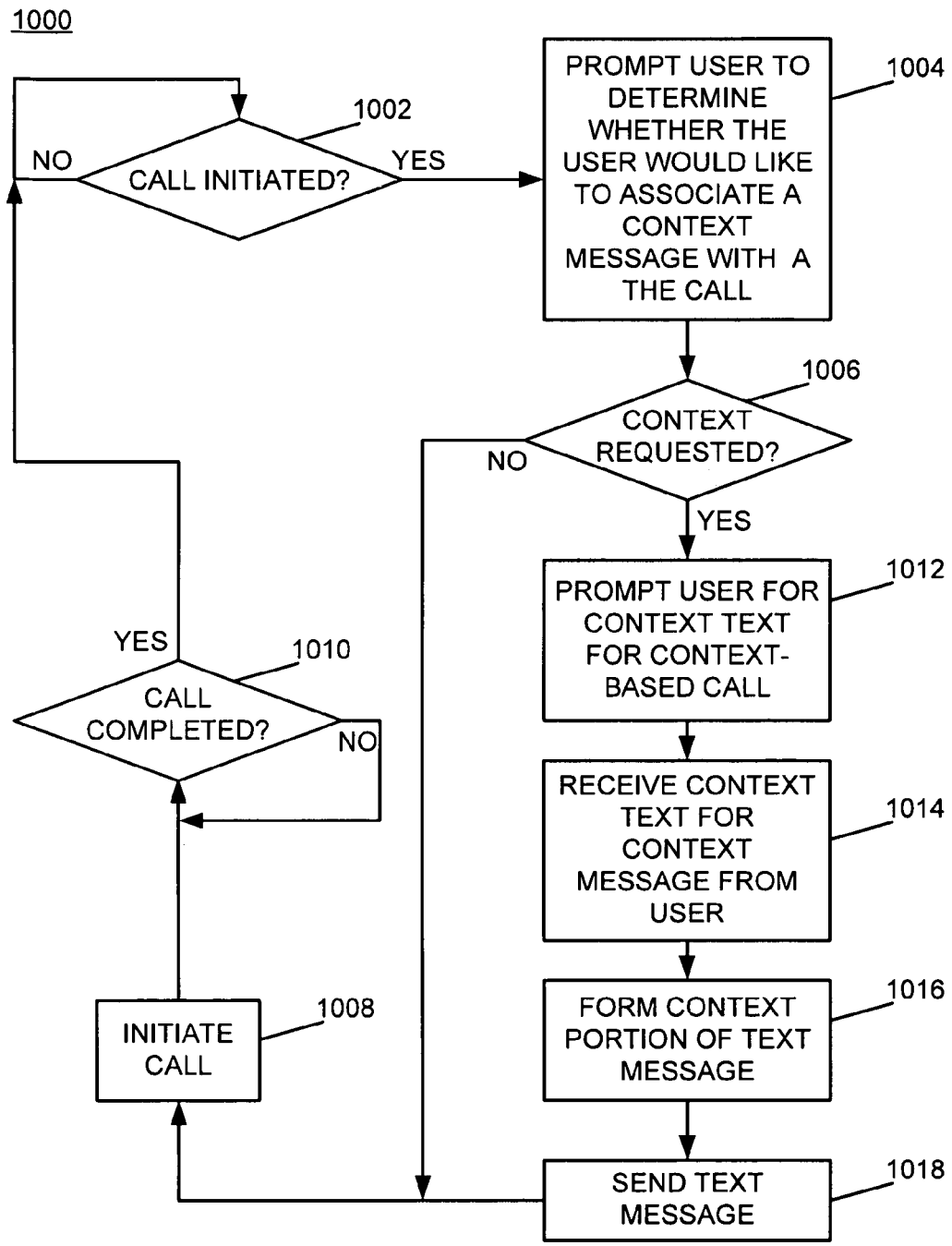
FIG. 10 is a flow chart of an example of an implementation of a process for providing automated call context notification by prompting a user of a communication device to add context to a voice call to create a context-based voice call according to an embodiment of the present subject matter.
Figure 11:
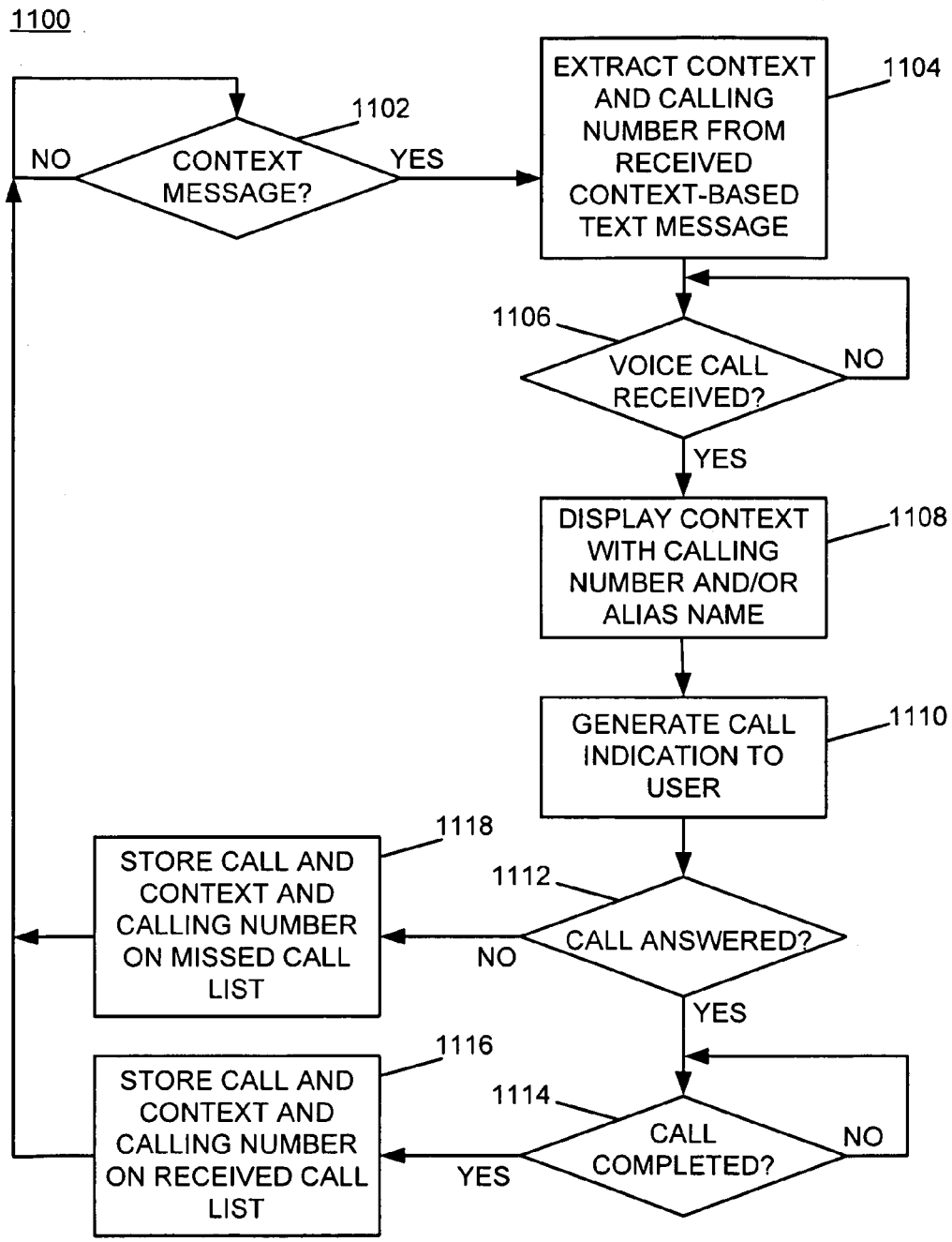
FIG. 11 is a flow chart of an example of an implementation of a process for providing automated call context notification by synchronizing receipt of context information with a voice call and displaying the received call context information to a user of a communication device to notify the user that a context-based voice call is being received according to an embodiment of the present subject matter.

Accordingly, the context and voice call synchronizing device 200 may take many forms and may be associated with many platforms. FIG. 3 below provides an example of an implementation of context-based voice call synchronization for a wireless communication system. FIG. 4 and FIG. 5 below represent example message flow diagrams to illustrate example high-level messaging to implement context and voice call synchronization between the components of FIG. 3. FIG. 9 through FIG. 11 below describe example processes that may be executed by the context and voice call synchronizing device 200 and/or other components that implement context and voice call synchronization capabilities.

FIG. 3 is a block diagram of an example of an implementation of a system 300 for automated call context notification based upon synchronization of a call context notifier and a voice call between wireless communication devices. Within FIG. 3, a wireless device 302 and a wireless device 304 are shown. For purposes of the following description it is assumed that a user of the wireless device 302 wishes to send a context-based call to the wireless device 304.

To initiate the context-based call, the user of the wireless device 302 enter commands and information sequences via a user interface application or module, such as the user interface 214, using the input device 206 and the display 204. Upon receipt of sufficient information to create a context-based call, the user interface application 214 passes control to the synchronizer module 216. The synchronizer module 216 may send messaging similar to that described within FIG. 4 and FIG. 5 below using the communication module 208 to initiate and manage context-based call processing.

The wireless device 302 communicates via a wireless network 306 to a mobile switching center (MSC) 308. The MSC 308 interfaces with a short message service center (SMSC) 310 for short message service (SMS) messaging. For purposes of the present subject matter, SMS messaging will be used to convey context in association with a voice call. However, this should not be considered limiting as any approach to associating context information with a voice call is considered within the scope of the present subject matter.

The MSC 308 and the SMSC 310 interface with a public switched telephone network (PSTN) 312 to communicate with other devices. A MSC 314 is illustrated interconnected via a wireless network 316 to the wireless device 304. As such, communication between the wireless device 302 and the wireless device 304 traverses several networks and components. For purposes of the present subject matter, it is sufficient to note that different types of signaling may be used within each network for the different portions of a context-based call.

For example, radio frequency communication may be used between the wireless device 302 and the MSC 308 and between the wireless device 304 and the MSC 316. A voice call may be established on a voice channel using control channel signaling and an SMS message may be communicated via the control channel Similarly, communication between the MSC 308 and the SMSC 310 may use control channel signaling to communicate an SMS message between the two devices.

Regarding the PSTN 312, signaling system seven (SS7) may be used to establish the voice portion of the call on a voice channel associated with the PSTN 312. Additionally, session initiation protocol (SIP) may be used for certain portions of the signaling described in association with the present subject matter, including communication of an SMS message portion of a context-based call. Additional description of lower level protocols is not believed necessary, as a person of skill can select appropriate messaging for a given platform based upon the description of the present subject matter provided herein.

Additionally, it is noted that home location registers (HLRs) and visitor location registers (VLRs) may be associated with the MSC 308 and the MSC 314 to allow the wireless device 302 and the wireless device 304 to roam and for the respective devices to be found for context-based call completion. However, as with the lower level protocols, it is believed that a person of skill can manage these aspects of the chosen platform based upon the description provided herein. As such, these devices are not shown within FIG. 3 for ease of illustration purposes.

Accordingly, FIG. 4 and FIG. 5 below represent example messaging that may be used for automated call context notification based upon the example block diagram of FIG. 3 for synchronization of a call context notifier and a voice call between wireless communication devices. Many other messaging arrangements are possible and all are considered within the scope of the present subject matter.

Additionally, as described above, a user of the wireless device may use the user interface application 214 to initiate a context-based call. Example user interface options are described beginning with FIG. 7 below for the user with respect to creation of a context-based call. For purposes of the examples within FIG. 4 and FIG. 5 below, it is assumed that the user has initiated creation of a context-based call and the appropriate module, such as the synchronizer module 216, has begun processing to establish the context-based call.

FIG. 4 is a message flow diagram of an example of an implementation of a message sequence 400 for automated call context notification where the receiving device performs synchronization activities. Within the present example, upon a determination that the user has requested initiation of a context-based call, the wireless device 302 sends a context call pending message to the MSC 308 (line 1). The context call pending message may include information, such as the calling number, the called number, and other information sufficient to allow routing and to provide information for the respective nodes to further process a context-based call. Upon receipt of the context call pending message, the MSC 308 forwards the context call pending message to the MSC 314 (line 2). Upon receipt of the context call pending message, the MSC 314 sends a call pending message to the wireless device 304 (line 3).

Upon completion of the information input by the user of the wireless device 302, the wireless device 302 sends an SMS message including the context information to the MSC 308 (line 4). The wireless device 302 begins setup of a voice call by initiating a voice call with the MSC 308. For purposes of the present description, general messaging formats are used. As such, the wireless device 302 sends a voice call initiation message to the MSC 308 (line 5) to initiate a voice call. It is understood that processing of the SMS message and the voice call may be asynchronous any stage of processing.

Upon receipt of the SMS message, the MSC 308 forwards the SMS message to the SMSC 310 for processing and delivery to the wireless device 304 (line 6). Upon receipt of the voice call initiation message, the MSC 308 begins signaling with the MSC 314 to establish a voice call with the wireless device 304, within the present example by sending a call initiation message to the MSC 314 (line 7). It is understood that signaling may vary depending upon changes in signaling format. Again, general messaging formats are used for ease of illustration purposes.

Upon receipt of the voice call initiation message, the MSC 314 initiates signaling with the wireless device 304 to establish a voice call (line 8). However, for purposes of the present example, the wireless device 304 may perform synchronization activities and will delay acknowledgement of the voice call initiation message, as described in more detail below.

Regarding processing by the SMSC 310, upon receipt of the SMS message, the SMSC 310 makes a determination as to whether the SMS message may be delivered to the wireless device 304. Additional signaling for this determination is not shown within FIG. 4. However, it is understood that the SMSC determine whether the wireless device 304 is active and locate the associated mobile switching center associated with the wireless device 304 prior to forwarding the SMS message. Upon determining that the wireless device 304 is active, the SMSC 310 forwards the SMS message to the MSC 314 (line 9).

Upon receipt of the SMS message, the MSC 314 forwards the SMS message to the wireless device 304 (line 10). In response to receipt of the SMS message, the wireless device 304 determines that the context portion of the context-based call has been received. This determination may be made by comparing the received calling number associated with origination of both the voice call and the SMS message.

Upon determining that the voice call and the SMS message form a context-call message pair, the wireless device 304 may present context information received in association with the SMS message to the user of the wireless device 304 in association with generating a ring tone, vibration, or illumination (all not shown) on the wireless device 304. As such, the wireless device 304 may include a call indication device to vibrate, emit sound, or illuminate to form a call indication to a user of the wireless device 304. The call indication device may include modules, such as a ringer, buzzer, tone generator, electromechanical transducer, light (e.g., light emitting diode—LED), or light array. Upon generation of a ring tone, the wireless device 304 may acknowledge the context-based call to the MSC 314 with a ringing message (line 11). The MSC 314 sends a ringing message to the MSC 308 (line 12) and the MSC 308 sends a ringing message to the wireless device 302 (line 13). Further signaling for the voice call is not believed particularly relevant to the present subject matter and is not shown within FIG. 4.

However, for purposes of the present subject matter, if the user hears the ring tone, feels the vibration, or sees the illumination, the user may review the displayed context information and make a determination as to whether to accept the voice call based upon the provided context information. For example, the user may recognize the phone number or an alias for the number (e.g., "Dad"), but may be in a meeting and unable to take the call. However, with the addition of context information, the user may determine that it is appropriate to take the call and prioritize the call over the meeting. For example, if the associated context information indicates that "I broke my leg," the user may determine that it is important to take the call in order to act upon the provided context information. As such, context in association with a voice call provides information that allows the user to prioritize a received call over other activities. Additionally, if the call is missed, the user may prioritize returning calls from a missed call history list based upon the provided context information.

FIG. 5 is a message flow diagram of an example of an implementation of a message sequence 500 for automated call context notification where the MSC 314 associated with the receiving device performs synchronization activities. As with FIG. 4 above, within the present example, upon a determination that the user has requested initiation of a context-based call, the wireless device 302 sends a context call pending message to the MSC 308 (line 1). Additionally, the signaling between the respective components through the MSC 308 sending the voice call initiation message to the MSC 314 (line 2 through line 7) is similar to the signaling described above in association with FIG. 4.

However, within the present example, the MSC 314 waits to forward the voice call initiation message to the wireless device 304 until it receives the associated context within the SMS message from the SMSC 310. As such, the SMSC 310 sends the SMS message to the MSC 314 (line 8) upon completion of any internal processing. Accordingly, upon receipt of the SMS message, the MSC 314 initiates signaling with the wireless device 304 by sending the voice call initiation message to the wireless device 304 to establish a voice call (line 9). The MSC 314 forwards the SMS message to the wireless device 304 (line 10). In response to receipt of the SMS message, the wireless device 304 determines that the context portion of the context-based call has been received as described above in association with FIG. 4. The remaining messaging in FIG. 5 for line 11 through line 13 is similar to that of FIG. 4. As such, the description is not repeated in association with FIG. 5.

As such, FIG. 5 illustrates example messaging for automated call context notification where the mobile switching center MSC 314 associated with the receiving device performs synchronization activities. As can be seen from FIG. 5, the MSC 314 waited to receive both the SMS message and the voice call initiation message prior to sending either message to the wireless device 304. The order of receipt and transmission of both messages may be altered without departure from the scope of the present subject matter.

It is understood that other forms of synchronization are possible. For example, a receiving mobile switching center, such as the MSC 314 within the examples above, may provide a subscription service that allows other network devices to subscribe to arrival notifications for voice calls. As such, upon receipt of an SMS message associated with a context-based voice call, the SMSC 310 may subscribe to a voice call notification from the MSC 314 rather than immediately forwarding the SMS message for delivery. Upon of the voice call portion of the context-based voice call, the MSC 314 may send a voice call notification message to the SMSC 310 indicating that the voice call is ready for delivery. The SMSC 310 may then send the SMS message to the MSC 314 for synchronized delivery with the voice call to the wireless device 304. Many other forms of synchronization are possible and all are considered within the scope of the present subject matter.

As an alternative to modification of network components as described above, synchronized context-based voice calls may also be implemented without modification of network components. For example, by modification of the sending and receiving devices, such as the wireless device 302 and the wireless device 304, respectively, network components may manage the respective portions of the context-based voice call without knowledge of the association of the SMS message with the voice call. By use of the protocol description unit (PDU) mode for text messaging of the text mode for text messaging, the wireless device 302 and the wireless device 304 may be configured to synchronize the SMS message and voice call portions of the context-based call without intervention of other network components.

Regarding the PDU mode for SMS messaging, the header portion of the message may be modified, for example, to include an indicator or flag to indicate that the SMS message is associated with a context-based voice call. The indicator or flag may be set by the sending device, such as the wireless device 302, in response to a user selection to establish a context-based voice call. The indicator or flag may be interpreted upon receipt by the receiving device, such as the wireless device 304, to delay delivery of the received SMS message to the user via the display 204 until receipt of associated signaling to initiate the paired voice call.

Figure 6:
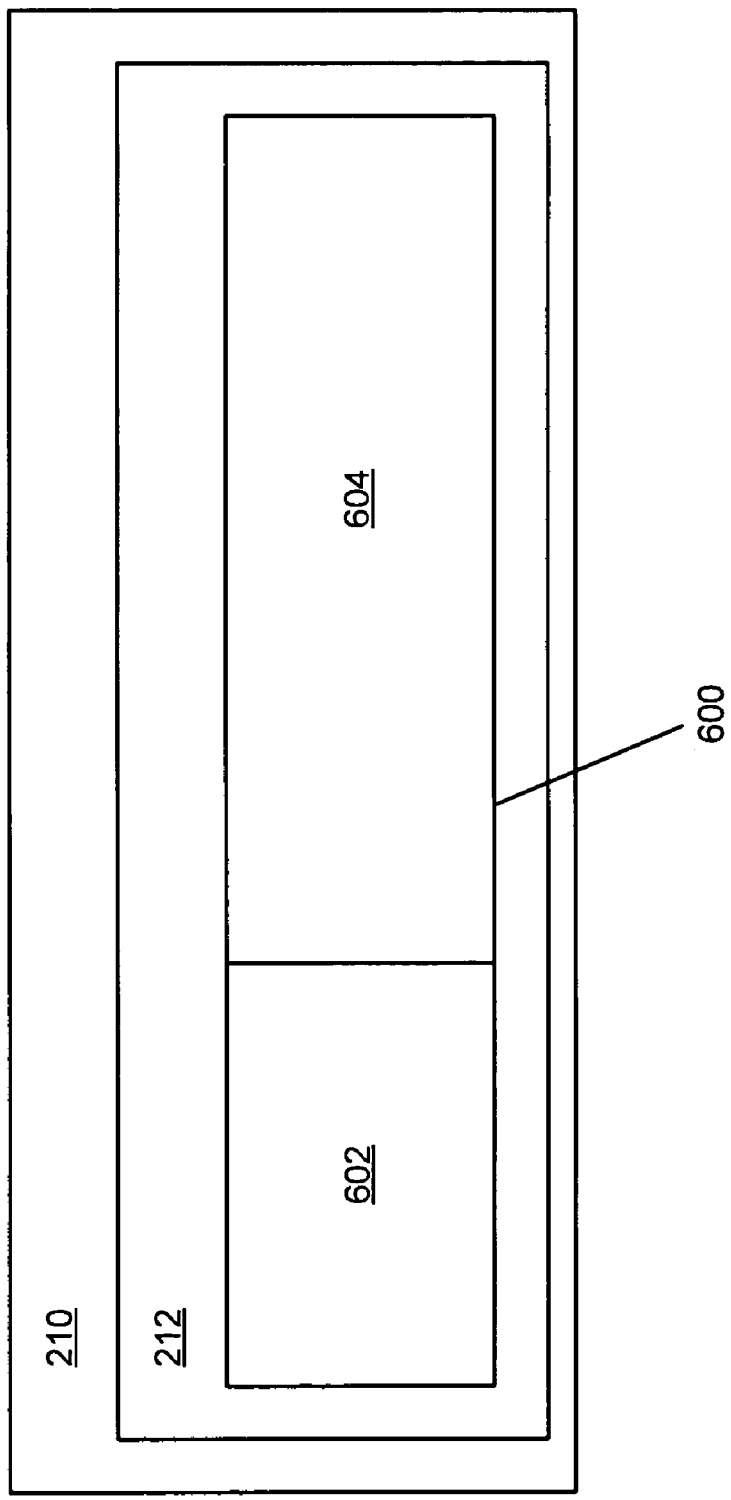
FIG. 6 is a diagram of an example of an implementation of a text mode SMS message that may be used to synchronize a context-based voice call with the SMS message at a receiving device according to an embodiment of the present subject matter.

Regarding the text mode for SMS messaging, a portion of the available text area may be used, for example, to create a header within the text field for processing of context-based voice calls. FIG. 6 below illustrates example modifications to a text mode SMS message to facilitate context-based voice call synchronization by communication devices such as the wireless device 302 and the wireless device 304.

FIG. 6 is a diagram of an example of an implementation of a text mode SMS message 600 that may be used to synchronize a context-based voice call with the SMS message at a receiving device, such as the wireless device 304. The example text mode SMS message may be formed and stored by the sending device, such as the wireless device 302 prior to sending the text mode SMS message to the receiving device. As such, the example text mode SMS message of FIG. 6 is shown within the synchronization storage area 212 of the memory 210. It is understood that upon receipt of the text mode SMS message, the wireless device 304 may store the received text mode SMS message to its own respective synchronization storage area 212 of its respective memory 210. Accordingly, the representation of the example text mode SMS message represents either of the respective locations.

Within FIG. 6, the text mode SMS message 600 includes a text-based header 602 and a text payload area 604. The text-based header 602 may be partitioned based upon the following example text mode SMS header partitioning illustrated within the following Table 1.

TABLE 1

Example header partitioning

| Field Name | Length | Field Contents |
|---|---|---|
| Date/Time | 21 | <dt>yyyymmdd hh:mm:ss |
| From | 25 | <from>xxxxxxxxxxxxxxxxxxx |
| To | 23 | <to> xxxxxxxxxxxxxxxxx |
| Context Identifier | 3 | <c> |

As can be seen from the example text mode SMS header partitioning of Table 1, a "Date/Time" field is shown to include twenty one (21) characters. The field contents include a "date/time" tag (e.g., "<dt>") and a text-based date and time identifier with the year (e.g., "yyyy"), month (e.g., "mm"), day (e.g., "dd"), hour (e.g., "hh"), minute (e.g., "mm"), and second (e.g., "ss") represented. A "From" field includes a phone number for the calling number as a twenty five (25) character field. The first six (6) characters include a "from" tag (e.g., "<from>"). The remaining nineteen (19) characters include a phone number in any suitable format. For purposes of example, an International Standard 19 character number format (e.g., 10 for phone number, 3 for indicative, and 6 for extension) may be used. A "To" field includes a phone number for the called number as a twenty three (23) character field. The first four (4) characters include a "to" tag (e.g., "<to >"). The remaining nineteen (19) characters include a phone number in any suitable format. For purposes of example, an International Standard 19 character number format (e.g., 10 for phone number, 3 for indicative, and 6 for extension) may also be used. A "Context Identifier" field includes a "context" tag (e.g., "<c>") that indicates to the receiving device that the context portion of the context-based call follows within the text payload area 604.

As such, upon receipt of the SMS message 600, the wireless device 304 may parse the text of the SMS message 600 to identify the respective tags. When all four tags (e.g., <dt>, <from>, <to >, and <c>) have been identified within a text portion of the SMS message 600, the wireless device 304 may begin processing to synchronize the SMS message 600 with a received voice call portion of a context-based call. If the voice call portion of the context-based call has been received, the wireless device 304 may associate the context with the call as the phone is ringing. If the voice call portion of the context-based call has been received and not answered, the wireless device 304 may associate the context with the call in a missed calls list. If the SMS message 600 is received before the voice call portion of the context-based call, the wireless device 304 may delay delivery of the context to the user until the associated voice call portion of the context-based call is received to synchronize delivery of the two portions of the context-based call. Appropriate timeouts may be employed to terminate synchronization activities for any mismatched context messages and voice calls.

Figure 7:
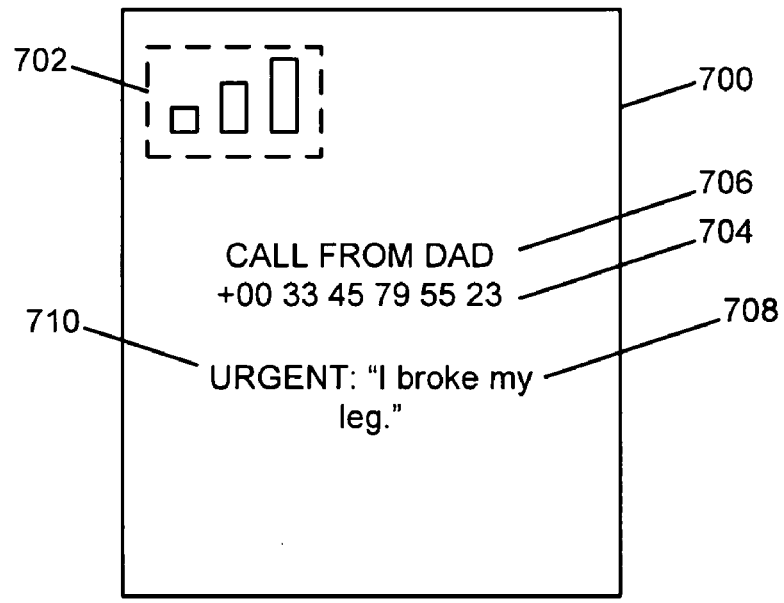
FIG. 7 is a diagram of an example of an implementation of a user interface screen for a context-based call as it is being delivered to a user of a communication device according to an embodiment of the present subject matter.

FIG. 7 is a diagram of an example of an implementation of a user interface screen 700 for a context-based call as it is being delivered to a user of a communication device, such as the wireless device 304. Signal indicators 702 represent the current signal strength associated with the wireless device 304. A calling telephone number 704 is shown associated with an alias 706 for the calling telephone number 704. Within the present example, the alias 706 shows that "Dad" is calling. A context message 708 shows the purpose of the phone call. Within the present example, it can be seen that the message from dad indicates a context for the call of "I broke my leg." As such, the user of the wireless device 304 may determine the purpose of the call prior to answering the context-based call. A priority indicator 710 further refines the context by indicating that the call is "urgent." As such, the user of the wireless device 304 may further prioritize receipt of the call based upon the priority assigned by the caller.

Figure 8:
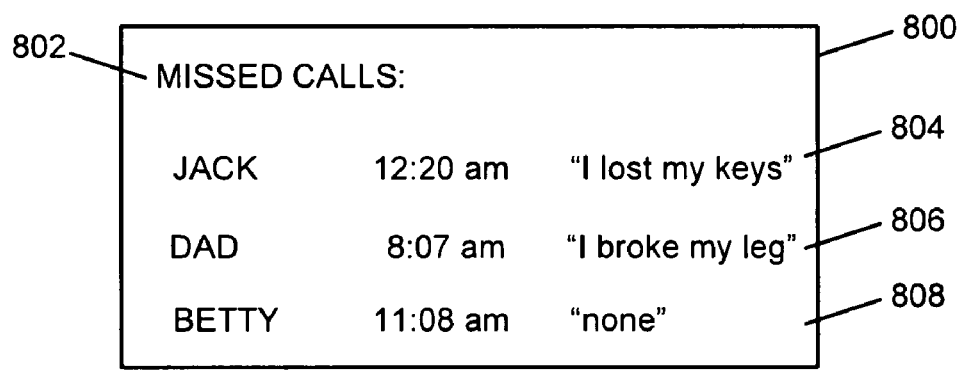
FIG. 8 is a diagram of an example of an implementation of a user interface screen for a missed call list for context-based calls that has been missed by a user of a communication device according to an embodiment of the present subject matter.

FIG. 8 is a diagram of an example of an implementation of a user interface screen 800 for a missed call list for context-based calls that has been missed by a user of a communication device, such as the wireless device 304. A missed call list identifier 802 is shown to alert the user of the missed calls. A first missed call identifier 804 is shown from a calling number with an alias of "Jack" at 12:20 am with a context of "I lost my keys." A second missed call identifier 806 is shown from a calling number with an alias of "Dad" at 8:07 am with a context of "I broke my leg." The second missed call identifier 806 represents the call from FIG. 7 above if the call had been missed. As such, the user of the wireless device 304 may prioritize calling dad to help with the broken leg before calling Jack to solve Jack's lost key problem. A third missed call identifier 808 is shown from a calling number with an alias of "Betty" at 11:08 am with a context of "none" to indicate that Betty chose not to associate context with the call or that Betty was calling from a service or device without an option to create a context-based call. As such, the user of the wireless device 304 may further prioritize missed calls based upon the priority assigned by the caller.

FIGS. 9 through 11 below describe example processes that may be executed by communication devices, such as the wireless device 302 and the wireless device 304, respectively, to provide automated call context notification based upon synchronization of a call context notifier and a voice call between communication devices associated with the present subject matter. The example processes may be performed by modules, such as the synchronizer module 216 and/or executed by the CPU 202, associated with communication devices. It should be noted that time out procedures and other error control procedures are not illustrated within the example processes described below for ease of illustration purposes. However, it is understood that all such procedures are considered to be within the scope of the present subject matter.

FIG. 9 is a flow chart of an example of an implementation of a process 900 for providing automated call context notification for a context-based voice call. At block 902, the process 900 receives a request to initiate a context-based voice call, where the request comprises a calling number, a called number, and a text string comprising a context portion of the context-based voice call. At block 904, the process 900 receives a request to initiate a voice call portion of the context-based voice call from the calling number to the called number. At block 906, the process 900 synchronizes the voice call portion and the context portion of the context-based voice call between a calling device referenced by the calling number and a called device referenced by the called number. It should be understood that the process 900 may be executed on at least any of the wireless device 302, the wireless device 304, the MSC 308, and the MSC 314.

FIG. 10 is a flow chart of an example of an implementation of a process 1000 for providing automated call context notification by prompting a user of a communication device, such as the wireless device 302, to add context to a voice call to create a context-based voice call. At decision point 1002, the process 1000 waits for the user to initiate a voice call. When a determination is made that the user has initiated a voice call, the process 1000 prompts the user to determine whether the user would like to associate a context message with the call at block 1004. At decision point 1006, the process 1000 makes a determination as to whether the user has requested to associate a context message with the call. When a determination is made that the user has indicated not to associate a context message with the call, the process 1000 initiates voice call signaling at block 1008. At decision point 1010, the process 1000 waits until the call has been completed and returns to decision point 1002 to await a now call to be initiated.

Returning to the description of decision point 1006, when a determination is made that the user has requested to associate a context message with the call, the process 1000 prompts the user for a context text for a context message to associate with the voice call at block 1012. At block 1014, the process 1000 receives context text for a context message from the user. At block 1016, the process 1000 forms a context portion of a text message to associate with a voice call to create a context-based voice call. At block 1018, the process 1000 sends the text message to the destination communication device, such as the wireless device 304. The process 1000 continues to block 1008 to process the voice portion of the created context-based voice call as described above.

As such, the process 1000 provides automated call context notification by prompting a user of the wireless device 302 to add context to a voice call to create a context-based voice call. The process 1000 also manages both the text portion and the voice portion of the context-based voice call. Additional processing for lower level activities associated with setup and teardown of voice calls is not shown within FIG. 10 for ease of illustration purposes. However, it is understood that such processing may be included within FIG. 10. Furthermore, additional processing to send a context call pending message, as described above in association with FIG. 4 and FIG. 5, may also be added to the process 1000. Accordingly, any such processing is considered to be within the scope of the present subject matter.

FIG. 11 is a flow chart of an example of an implementation of a process 1100 for providing automated call context notification by synchronizing receipt of context information with a voice call and displaying the received call context information to a user of a communication device, such as the wireless device 304, to notify the user that a context-based voice call is being received. At decision point 1102, the process 1100 waits for a context message to be received. As described above, a context message may include a text message, such as a SMS message that is associated with a pending voice portion of a context-based call. For purposes of the present example, it is assumed that the text message portion of the context-based call is received before the voice portion of the context-based call. Modifications may be made to the process 1100 to account for other arrival permutations. As such, all such permutations are considered within the scope of the present subject matter.

When a determination is made that a context message has been received, the process 1100 extracts context from the received text message and calling number information for the associated voice portion of the context-based call at block 1104. At decision point 1106, the process 1100 waits for a voice call associated with the received context message to be received. It is also assumed for purposes of the present example that the associated voice call is received in a timely fashion. As such, when the process 1100 makes a determination that the voice call associated with the received context message has been received, the process 1100 displays the extracted context information with the calling number and/or any defined alias (e.g., "Dad") associated with the calling number at block 1108. At block 1110, the process 1100 generates a call indication to the user of the wireless device 304. For example, the process 1100 may generate a ring tone, a vibration, or an illumination (not shown) to alert the user that the context-based call is available to be answered.

At decision point 1112, the process 1100 makes a determination as to whether the context-based call was answered. For purposes of the present example, it is further assumed that the process 1100 waits a reasonable time to make this determination to allow the user to assess the context associated with the voice call and to answer if the user would like to answer the context-based call. When a determination is made that the context-based call was answered, the process 1100 waits at decision point 1114 until the call has been completed. When the call has been completed, the process 1100 stores the received call context information and the calling number and/or any associated alias to memory, such as to the synchronization storage area 212 within the memory 210, on a received call list at block 1116 and returns to decision point 1102 to await receipt of a new context message. When a determination is made at decision point 1112 that the context-based call was not answered, the process 1100 stores the call context and the calling number and/or any associated alias to memory, such as to the synchronization storage area 212 within the memory 210, on a missed call list, such as the missed call list shown on the example user interface screen 800 of FIG. 8, at block 1118. The process 1100 returns to decision point 1102 to await receipt of a new context message.

As such, the process 1100 provides automated call context notification by synchronizing receipt of context information with a voice call and displaying the received call context information to a user of the wireless device 304 to notify the user that a context-based voice call is being received. The process 1100 also stores the call context information on a received call list or a missed call list based upon whether the context-based call was answered or not answered, respectively. Additional processing for lower level activities associated with setup and teardown of voice calls is not shown within FIG. 11 for ease of illustration purposes. However, it is understood that such processing may be included within FIG. 11. Furthermore, additional processing to receive a context call pending message, as described above in association with FIG. 4 and FIG. 5, may also be added to the process 1100. Accordingly, any such processing is considered to be within the scope of the present subject matter.

As described above in association with FIGS. 1 through 11, the example systems and processes provide automated call context notification. Many other variations and additional activities associated with automated call context notification are possible and all are considered within the scope of the present subject matter.

Those skilled in the art will recognize, upon consideration of the above teachings, that certain of the above exemplary embodiments are based upon use of a programmed processor such as the CPU 202. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method, comprising:
receiving, via a processor, a request comprising a short message service (SMS) message to initiate a context-based voice call, where the SMS message comprises a calling number, a called number, and a text string comprising a context portion of the context-based voice call;
extracting the text string from the SMS message;
receiving a request to initiate a voice call portion of the context-based voice call from the calling number to the called number;
synchronizing the voice call portion and the context portion of the context-based voice call between a calling device referenced by the calling number and a called device referenced by the called number comprising:
displaying the text string as context for the context-based voice call; and
generating a call indication to a user of the calling device;
determining whether the voice call portion of the context-based voice call was answered by the user; and
storing, in response to determining that the voice call portion of the context-based voice call was not answered by the user, the context portion and the calling number to a missed call list within a memory associated with the called device and that is adapted to store the context-based voice call information.

2. The method of claim 1, where the calling device comprises a wireless device.

3. The method of claim 1, where synchronizing the voice call portion and the context portion of the context-based voice call comprises receiving signaling from a mobile switching center (MSC) to initiate the voice call portion of the context-based voice.

4. The method of claim 1, where synchronizing the voice call portion and the context portion of the context-based voice call comprises receiving signaling from a mobile switching center (MSC) that the context-based voice call is pending.

5. The method of claim 1, where the called device comprises a wireless device.

6. A system comprising:
a memory adapted to store context-based voice call information;
a call indication device adapted to at least one of vibrate, emit sound, and illuminate;
a display device adapted to display information for a user of a calling device; and
a processor programmed to:
receive a request comprising a short message service (SMS) message to initiate a context-based voice call, where the SMS message comprises a calling number, a called number, and a text string comprising a context portion of the context-based voice call;
extract the text string from the SMS message;
receive a request to initiate a voice call portion of the context-based voice call from the calling number to the called number;
synchronize the voice call portion and the context portion of the context-based voice call between the calling device referenced by the calling number and a called device referenced by the called number, comprising:
displaying the text string as context for the context-based voice call on the display device; and
generating a call indication to the user of the calling device;
determine whether the voice call portion of the context-based voice call was answered by the user; and
store, in response to determining that the voice call portion of the context-based voice call was not answered by the user, the context portion and the calling number to a missed call list within the memory adapted to store the context-based voice call information.

7. The system of claim 6, where the calling device comprises a wireless device.

8. The system of claim 6, where, in being programmed to synchronize the voice call portion and the context portion of the context-based voice call, the processor is programmed to receive signaling from a mobile switching center (MSC) to initiate the voice call portion of the context-based voice.

9. The system of claim 6, where, in being programmed to synchronize the voice call portion and the context portion of the context-based voice call, the processor is programmed to receive signaling from a mobile switching center (MSC) that the context-based voice call is pending.

10. The system of claim 6, where the called device comprises a wireless device.

11. A system comprising:
a memory adapted to store context-based voice call information;
a call indication device adapted to at least one of vibrate, emit sound, and illuminate;

a display device adapted to display information for a user; and a processor programmed to:
- receive a short message service (SMS) message requesting initiation of a context-based voice call, where the SMS message comprises a calling number, a called number, and a text string comprising a context portion of the context-based voice call;
- extract the text string from the SMS message;
- receive a request to initiate a voice call portion of the context-based voice call from the calling number to the called number;
- display the text string as context for the context-based voice call on the display device;
- generate a call indication to the user via the call indication device;
- determine whether the voice call portion of the context-based voice call was answered by the user; and
- store, in response to determining that the voice call portion of the context-based voice call was not answered by the user, the context portion and the calling number to a missed call list within the memory adapted to store the context-based voice call information.

12. A computer program product comprising a non-transitory computer useable storage medium including a computer readable program, wherein the computer readable program when executed on a computer causes the computer to:
- receive a request comprising a short message service (SMS) message to initiate a context-based voice call, where the SMS message comprises a calling number, a called number, and a text string comprising a context portion of the context-based voice call;
- extract the text string from the SMS message;
- receive a request to initiate a voice call portion of the context-based voice call from the calling number to the called number;
- synchronize the voice call portion and the context portion of the context-based voice call between a calling device referenced by the calling number and a called device referenced by the called number, comprising:
  - displaying the text string as context for the context-based voice call; and
  - generating a call indication to a user of the calling device;
- determine whether the voice call portion of the context-based voice call was answered by the user; and
- store, in response to determining that the voice call portion of the context-based voice call was not answered by the user, the context portion and the calling number to a missed call list within a memory associated with the called device and that is adapted to store the context-based voice call information.

13. The computer program product of claim 12, where the calling device comprises a wireless device.

14. The computer program product of claim 12, where the computer readable program when executed on a computer causes the computer to receive signaling from a mobile switching center (MSC) to initiate the voice call portion of the context-based voice.

15. The computer program product of claim 12, where the computer readable program when executed on a computer causes the computer to receive signaling from a mobile switching center (MSC) that the context-based voice call is pending.

16. The computer program product of claim 12, where the called device comprises a wireless device.

* * * * *